Patented June 13, 1933

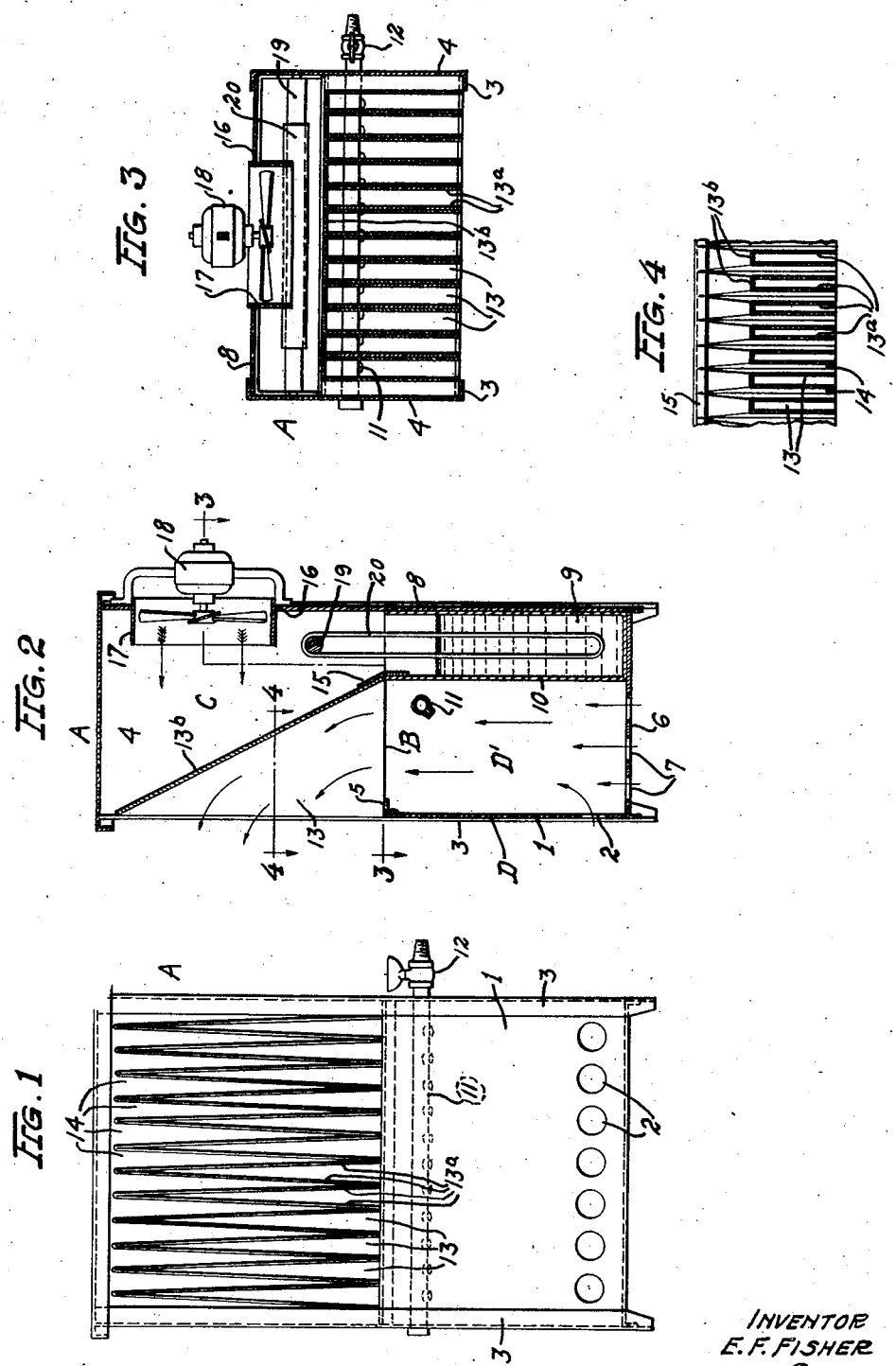

1,913,980

UNITED STATES PATENT OFFICE

ERNEST F. FISHER, OF ST. LOUIS, MISSOURI

HEATING APPARATUS

Application filed June 21, 1930. Serial No. 462,750.

This invention relates generally to heating apparatus of the type which comprises means for heating air and discharging said heated air into the room or compartment in which the apparatus is located, the predominant object of the invention being to provide an apparatus of this type which is of such improved construction that the apparatus will be caused to function in a highly efficient manner.

Fig. 1 is a front elevation of my improved heating apparatus.

Fig. 2 is a vertical section through the heating apparatus illustrated in Fig. 1.

Fig. 3 is a horizontal section on line 3—3 of Fig. 2.

Fig. 4 is a fragmentary horizontal section on line 4—4 of Fig. 2.

In the drawing, wherein is shown for the purpose of illustration, merely, one embodiment of the invention, A designates my improved heating apparatus generally, said apparatus including a suitably constructed casing which is divided at the point B located at its approximate vertical center into an upper section C and a lower section D. The lower section D of the apparatus may, for the sake of convenience in describing the invention, be referred to as the air-heating section, while the upper section may be termed the air-discharge section.

The lower section D comprises a front wall 1, which is provided at a point adjacent to its lower edge with a horizontal row of apertures 2. This front wall 1 is secured in any suitable manner, as by welding, to oppositely disposed inturned flange portions 3 formed on the side walls 4 of the casing of the apparatus, and at its upper edge the front wall 1 has an angle bar 5 fixed thereto (Fig. 2). The lower section includes also a bottom wall 6 which is likewise provided with apertures 7, and the rear wall 8 of the casing of the apparatus serves as the rear wall of the lower section D.

Disposed within the lower section D of the apparatus is a receptacle 9 which contains water or other fluid, said receptacle preferably extending entirely across the casing of the apparatus, as shown in Fig. 3, with its rear wall in contact with the rear wall of the casing of the apparatus and its opposite side walls in contact with the opposite side walls of said casing. The receptacle 9 is secured in place in any suitable manner. The front wall 10 of the receptacle 9 serves as the rear wall of an air-heating compartment D' through which air passes to be heated, said air-heating compartment being provided with a suitable heating device 11 by which heat is generated for the purpose of maintaining the interior of the compartment D at a high temperature. The particular heating device 11 illustrated in the drawing is a gas-burning heater which is controlled by a valve 12, but it is obvious that if preferred an electrical heating device, or a heating device of any other suitable type, may be employed within the air-heating compartment.

Extended upwardly from the upper end of the air-heating compartment D' of the apparatus is a plurality of hot air conductors 13, which, when viewed in front elevation as shown in Fig. 1, have each the approximate shape of an inverted V. These hot air conductors are open at their front faces from top to bottom, and the opposite sides of each thereof are provided by solid walls 13ª which converge to an approximate point at the top of the air conductor. The rear wall 13ᵇ of each air conductor inclines forwardly and upwardly from the rear edge of the air conductor at the bottom thereof, and also this rear wall tapers from its full width at its lower edge to an approximate point at its upper edge. At their lower portions the hot air conductors 13 are rectangular in horizontal section as shown clearly in Fig. 3, and as shown in the view referred to, adjacent side walls of contiguous air conductors are in close contact with each other. These adjacent walls of contiguous air conductors are welded together at the lower ends of the air conductors, hence the group of air conductors constitute what in effect is an integral unitary structure. Immediately above the lower ends of the air conductors the adjacent side walls of contiguous air conductors incline outwardly to provide V-shaped spaces 14, but at the precise lower ends of said air conductors such adjacent walls, as already stated, contact with each other and are welded together. To secure the unitary structure composed of the welded together air conductors in place, I provide a strip 15 which is welded or otherwise secured to the air conductors and to the front wall 10 of the receptacle 9, and to securely fix the air conductors in place at their forward ends said air conductors are welded or otherwise secured to the angle bar 5.

Formed in the rear wall of the casing of the apparatus is an aperture 16 in which a cylindrical element 17 is supported. This cylindrical element encloses the rotatable blades of an electric fan 18 which is supported by brackets secured to the rear wall of the casing of the apparatus. Extended transversely of the casing of the apparatus immediately beneath the cylindrical element 17 is a fixed rod 19, from which an absorbent element 20 is suspended. The absorbent element 20, which is preferably in loop form and may be formed of Terry cloth or other suitable material, is of substantial width, as shown in Fig. 3, and its lower end portion is submerged in the fluid contained in the receptacle 9.

In the use of the apparatus disclosed herein, air is drawn through the apertures 2 and 7 into the air-heating compartment, and during its passage through said air-heating compartment such air is heated. This heated air passes upwardly from the air-heating compartment into the air conductors 13, and said air is discharged into the room or compartment in which the heating apparatus is used by passing out at the open front faces of said air conductors, as indicated by the arrows in Fig. 2. The electric fan 18 is in operation during use of the apparatus, and air will be forced forwardly from the fan as indicated by the feathered arrows in Fig. 2, and this air will pass through the V-shaped spaces 14 located between adjacent air conductors, and will be discharged into the room or compartment in which the apparatus is employed. The air forced through the V-shaped spaces 14 between adjacent air conductors 13 will be heated by contact with the side and rear walls of said air conductors, and also such contact of said air with said air conductors will prevent overheating of the walls of said air conductors. Also, the passage of air from the electric fan through the V-shaped spaces 14 will create suction at the front wall of the apparatus, which will result in the heated air being drawn through the apparatus to the discharge point thereof at the front face of the apparatus.

The function of the absorbent element 20 is to conduct moisture from the interior of the receptacle 9 to the upper portion of the apparatus so that said moisture will be picked up by the air from the electric fan 18 and will be discharged into the room or compartment in which the apparatus is employed, whereby the air within said room or compartment will be supplied with the required moisture.

An important feature of the invention resides in the fact that the conductors 13 and spaces 14 are arranged alternately in a direction transversely of the apparatus, and because warm air issues from the forward faces of the air conductors 13 and cooler air passes from the front of the apparatus through the spaces 14, vertical stratification of alternately arranged bodies of warm and cool air discharged from the apparatus is obtained. This arrangement makes for a very complete commingling of the warm and cool air, whereby the temperature of the air discharged from the apparatus is more uniform than heretofore. Also, as the spaces 14 are wider at their tops than at the lower ends thereof, there will be a preponderance of cool air at the top, and this cool air will form a blanket of cooler air which prevents rapid rising of the warm air after discharge thereof from the apparatus, hence more uniform temperature is maintained in the room or compartment in which the apparatus is located.

I claim:

1. An air-heating apparatus comprising an air-heating compartment, heat-producing means within said air-heating compartment, and an air-discharge portion, said air-discharge portion comprising a plurality of air conductors of substantially inverted V-shaped formation arranged in communication with said air-heating compartment at their lower ends and provided with open front faces for the discharge of air therefrom, said air conductors being provided with upwardly and forwardly inclined rear walls.

2. An air-heating apparatus comprising an air-heating compartment, heat-producing means within said air-heating compartment, and an air-discharge portion, said air-discharge portion comprising a plurality of air conductors of substantially inverted V-shaped formation arranged in communication with said air-heating compartment at their lower ends and provided with open front faces for the discharge of air therefrom, said air conductors being provided with upwardly and forwardly inclined rear walls, and adjacent side walls of contiguous air conductors being secured together.

3. An air-heating apparatus comprising an air-heating compartment, heat-producing means within said air-heating compartment, and an air-discharge portion, said air-discharge portion comprising a plurality of air conductors of substantially inverted V-shaped formation arranged in communication with said air-heating compartment at their lower ends and provided with open front faces for the discharge of air therefrom, said air conductors being arranged in a horizontal row with spaces between contiguous air conductors, and means for forcing air through said V-shaped spaces, said means being located so as to force air through said spaces in the direction of movement of the heated air being discharged from said air conductors.

4. An air-heating apparatus comprising an air-heating compartment, heat-producing means within said air-heating compartment, and an air-discharge portion, said air-discharge portion comprising a plurality of air conductors of substantially inverted V-shaped formation arranged in communication with said air-heating compartment at their lower ends and provided with open front faces for the discharge of air therefrom, said air conductors being arranged in a horizontal row with substantially V-shaped spaces between contiguous air conductors, and means for forcing air through said V-shaped spaces, said means being located so as to force air through said spaces in the direction of movement of the heated air being discharged from said air conductors.

5. An air-heating apparatus comprising an air-heating compartment, heat-producing means within said air-heating compartment, and an air-discharge portion, said air-discharge portion comprising a plurality of air conductors of substantially inverted V-shaped formation arranged in communication with said air-heating compartment at their lower ends and provided with open front faces for the discharge of air therefrom, said air conductors being arranged in a horizontal row with substantially V-shaped spaces between contiguous air conductors, and means comprising an electric fan for forcing air through said V-shaped spaces in the general direction in which heated air discharged from the air conductors moves.

6. An air-heating apparatus comprising an air-heating compartment, heat-producing means within said air-heating compartment, and an air-discharge portion, said air-discharge portion comprising a plurality of air conductors of substantially inverted V-shaped formation arranged in communication with said air-heating compartment at their lower ends and provided with open front faces for the discharge of air therefrom, said air conductors being arranged in a horizontal row with substantially V-shaped spaces between contiguous air conductors, means comprising an electric fan for forcing air through said V-shaped spaces in the general direction in which heated air discharged from said air conductors moves, a receptacle for fluid, and means for elevating moisture from the interior of said receptacle to a point adjacent to said electric fan.

7. An air-heating apparatus comprising an air-heating compartment, heat-producing means within said air-heating compartment, and an air-discharge portion, said air-discharge portion comprising a plurality of air conductors of substantially inverted V-shaped formation arranged in communication with said air-heating compartment at their lower ends and provided with open front faces for the discharge of air therefrom, said air conductors being arranged in a horizontal row with substantially V-shaped spaces between contiguous air conductors, means comprising an electric fan for forcing air through said V-shaped spaces in the general direction in which heated air discharged from said air conductors moves, a receptacle for fluid, and absorbent means for elevating moisture from the interior of said receptacle to a point adjacent to said electric fan.

8. An air-heating apparatus comprising an air-heating chamber through which air to be heated passes, and ducts communicating with and leading from said chamber and arranged to discharge hot air passing therethrough in a given direction, said ducts being so arranged as to provide spaces between adjacent ducts through which air passes in the same general direction as that in which the heated air discharged from the hot air ducts moves.

9. An air-heating apparatus comprising heat-producing means, a chamber in which said heat-producing means is located and through which air to be heated passes, hot air ducts communicating with said chamber and arranged to discharge hot air passing therethrough in a given direction, said hot air ducts being so arranged as to provide spaces between adjacent ducts through which air passes in the same general direction as that in which the heated air discharged from the hot air ducts moves, and means for forcing air through said spaces between said hot air ducts.

10. An air-heating apparatus comprising heat-producing means, a chamber in which said heat-producing means is located and through which air to be heated passes, hot air ducts communicating with and leading from said chamber and arranged to discharge hot air passing therethrough in a given direction, said hot air ducts being so arranged as to provide spaces between adjacent ducts through which air passes in the same general direction as that in which the heated air discharged from the hot air ducts moves, and means comprising a fan for forcing air through said spaces between said hot air ducts.

11. An air-heating apparatus comprising heat-producing means, a chamber in which said heat-producing means is located and through which air to be heated passes, hot air ducts communicating with and leading from said chamber and arranged to discharge hot air passing therethrough forwardly of said hot air ducts, said hot air ducts being so arranged as to provide spaces between adjacent ducts through which air other than the heated air referred to may pass, and means located rearwardly of said hot air ducts adapted to blow cooler air through said spaces between adjacent hot air ducts in the general direction of movement of the hot air being discharged from said hot air ducts.

In testimony that I claim the foregoing I hereunto affix my signature.

ERNEST F. FISHER.